United States Patent [19]
Jo

[11] Patent Number: 5,910,891
[45] Date of Patent: Jun. 8, 1999

[54] POWER SUPPLY WITH POWER FACTOR CORRECTION CIRCUIT

[75] Inventor: Sang-Soo Jo, Kyungki-Do, Rep. of Korea

[73] Assignee: SamSung Electronics Co., Ltd., Suwon, Rep. of Korea

[21] Appl. No.: 08/970,783

[22] Filed: Nov. 14, 1997

[30] Foreign Application Priority Data

Nov. 14, 1996 [KR] Rep. of Korea ................. 1996 54128

[51] Int. Cl.$^6$ .................................................. H02M 5/42
[52] U.S. Cl. .......................................... 363/89; 323/207
[58] Field of Search ........................ 363/37, 89; 323/207

[56] References Cited

U.S. PATENT DOCUMENTS

| | | | |
|---|---|---|---|
| 5,404,092 | 4/1995 | Gegner | 323/207 |
| 5,515,261 | 5/1996 | Bogdan | 363/89 |
| 5,610,451 | 3/1997 | Symonds | 363/37 |
| 5,661,645 | 8/1997 | Hochstein | 363/89 |
| 5,737,204 | 4/1998 | Brown | 363/89 |
| 5,742,103 | 4/1998 | Ashok | 363/39 |

OTHER PUBLICATIONS

Motorola Semiconductor Technical Data Book for parts #MC34262 and MC33262, 1993 pp. 1–16.

*Primary Examiner*—Stuart N. Hecker
*Attorney, Agent, or Firm*—Robert E. Bushnell, Esq.

[57] ABSTRACT

A power supply with a power factor correction circuit for use in a display monitor controls a switching power circuit in response to a voltage induced at a secondary winding of a transformer provided in the power factor correction circuit. Further, upon receiving a power saving control signal generated from a microcomputer provided in the display monitor, the power supply operates in the stand-by mode, (i.e., the power saving mode), in which only the power saving mode power supply circuit operates to supply operational power to the microcomputer.

14 Claims, 3 Drawing Sheets

POWER SUPPLY WITH POWER FACTOR CORRECTION CIRCUIT

CLAIM OF PRIORITY

This application makes reference to, incorporates the same herein, and claims all benefits accruing under 35 U.S.C. §119 from an application for *POWER SUPPLY WITH POWER FACTOR CORRECTION CIRCUIT* earlier filed in the Korean Industrial Property Office on the $14^{th}$ of Nov. 1996 and there duly assigned Serial No. 54128/1996.

BACKGROUND OF THE INVENTION

1. Technical Field

The present invention relates to a power supply for a display monitor, and more particularly to a power supply apparatus with power factor correcting and power saving functions.

2. Related Art

As explained in more detail below, power supplies have typically been provided with a power saving function. However, such power supplies having the power saving function have a limitation in terms of power saving capability. Therefore, there has been a need to develop a power factor correction circuit for employment in power supplies in order to improve the efficiency of the power saving function. Employment of a power supply having a power factor correction circuit in display monitors is particularly necessary in order that power be saved more efficiently.

SUMMARY OF THE INVENTION

It is, therefore, an object of the present invention to provide a power supply with a power factor correction circuit adapted to be used for a display monitor.

According to an aspect of the present invention, the power supply for use in a display monitor includes: a rectifying circuit for rectifying an AC voltage input to generate a DC voltage; a switching power circuit for controlling a voltage applied thereto; a power saving control circuit switched in response to a power saving control signal generated from a microcomputer provided in the display monitor; a power saving mode power circuit for supplying the power to the microcomputer during a power saving mode; and a power factor correction circuit for correcting a power factor of the DC voltage to supply the corrected power factor to the switching power circuit and the power saving control circuit, supplying a driving voltage to a main power controller provided in the switching power circuit, and cutting off the driving voltage supplied to the main power controller during the power saving mode.

The power factor correction circuit according to the present invention includes: a power factor correction controller for correcting the power factor of the DC voltage output from the rectifying circuit; an initial driving power input element for supplying an initial driving current to the power factor correction controller; a transformer for supplying driving voltage to the power factor correction controller and the main power controller; a switching element switched by the power factor correction controller; voltage dividing elements for supplying a predetermined divided voltage of the DC voltage to the power factor controller; rectifying elements for rectifying first and second induced voltages of the transformer; and smoothing elements for smoothing the first and second induced voltages of the transformer.

The voltage dividing elements according to the present invention include: a first voltage dividing element for dividing the DC voltage to provide a first divided voltage to a multiplier provided in the power factor correction controller; a second voltage dividing element for dividing an output voltage from the power factor correction controller to generate a second divided voltage which is fed back to the power factor correction controller; a third voltage dividing element for determining a level of the output voltage generated from a primary winding of the transformer.

The rectifying elements according to the present invention include: a first rectifying element for rectifying an output voltage of a primary winding of the transformer, an output voltage from the first rectifying element being supplied to the switching power circuit; a second rectifying element for rectifying an output voltage from a first secondary winding of the transformer, an output voltage from the second rectifying element being supplied to the power factor correction controller; and a third rectifying element for rectifying an output voltage from a second secondary winding of the transformer, an output voltage from the third rectifying element being supplied to the main power controller.

The smoothing elements according to the present invention include a first smoothing element for smoothing the output voltage from the first rectifying element, and a second smoothing element for smoothing the output voltage from the third rectifying element.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENT

Figure 1:
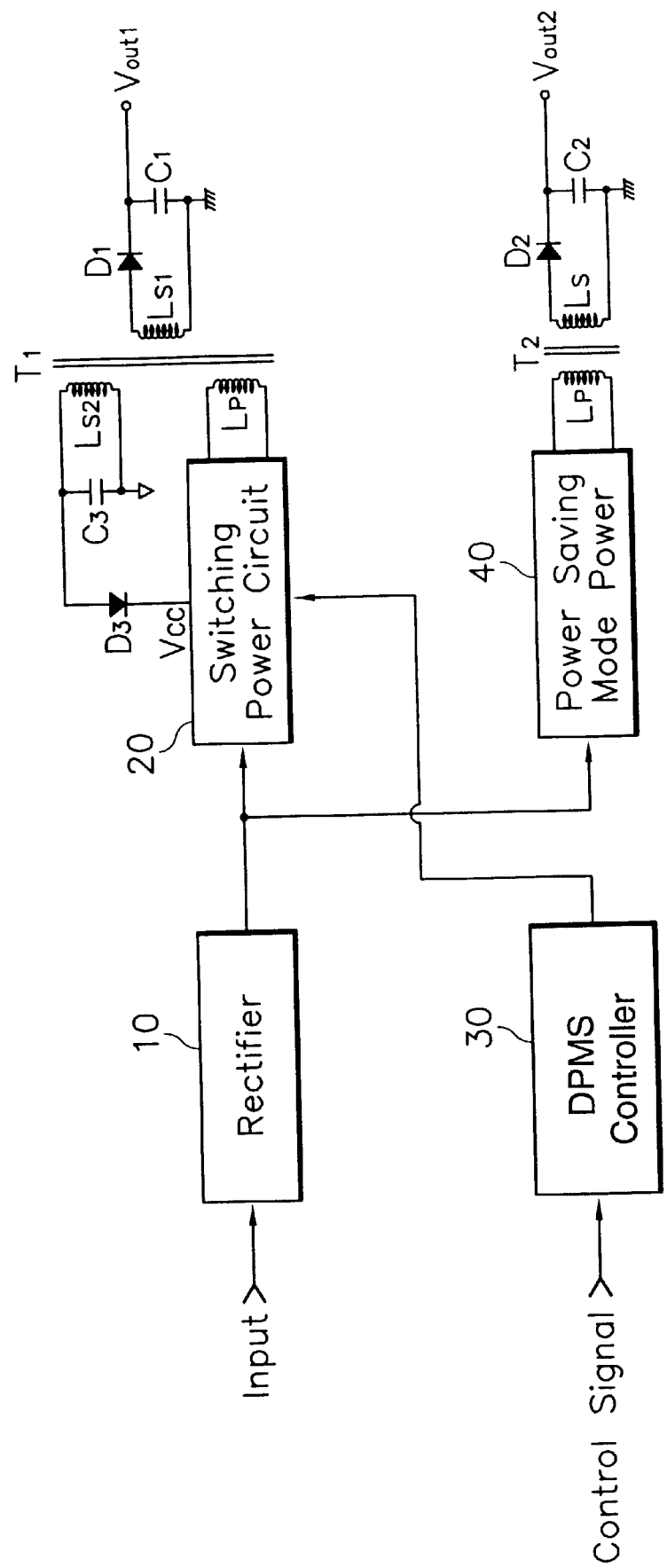
FIG. 1 is a schematic diagram of a power supply with a power saving function.

A power supply according to an embodiment of the present invention will be described in detail hereinbelow with reference to the attached drawings, in which like reference numerals represent like elements. Further, for convenience, explanations for similar operations will not be repeated.

Referring to FIG. 1, a power supply with power saving function includes a rectifying circuit 10, a switching power circuit 20, a DPMS (display power management system) controller 30, a power saving mode power circuit 40, and transformers T1 and T2. The power supply further includes rectifying diodes D1, D2 and D3, and smoothing capacitors C1, C2 and C3.

Figure 2:
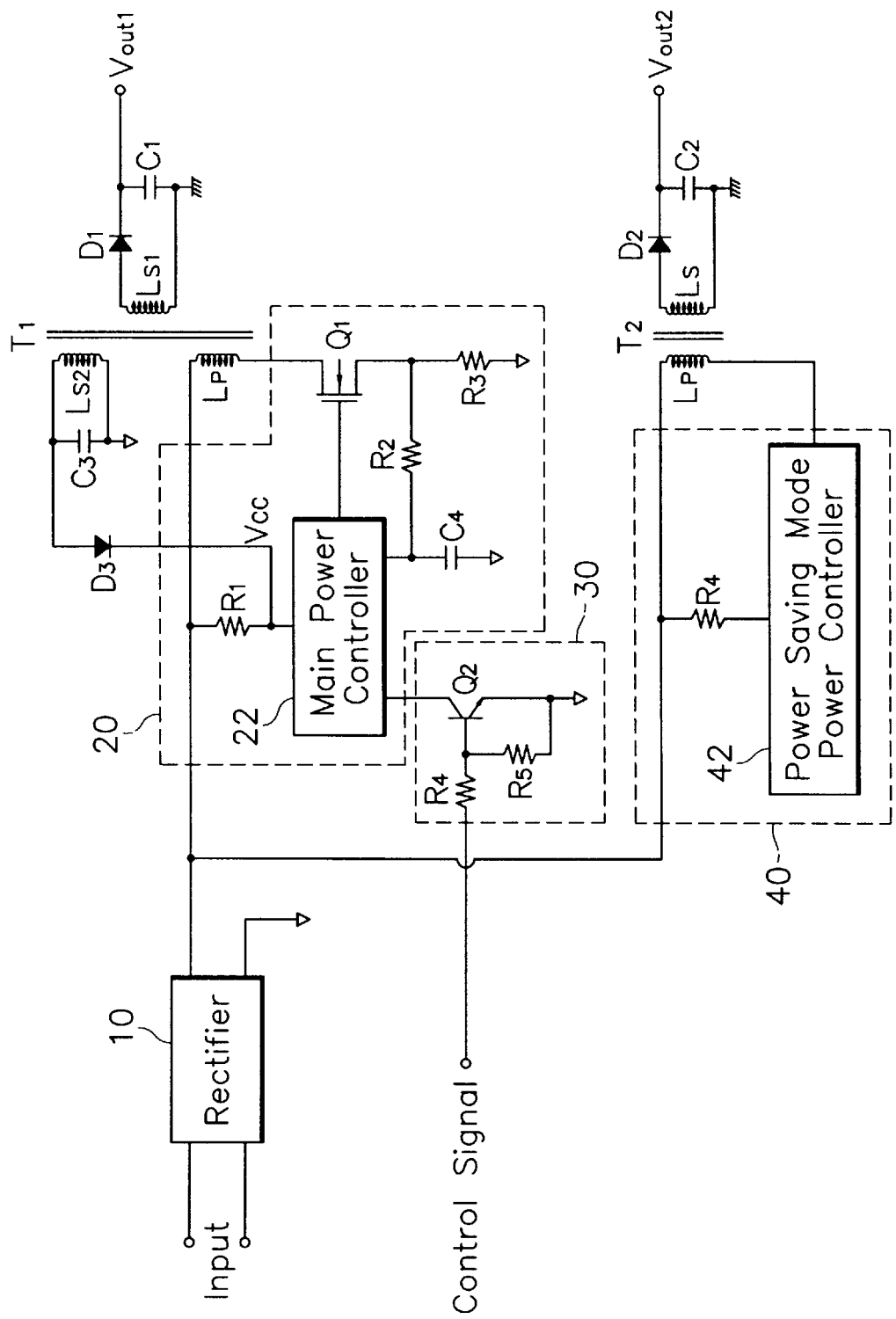
FIG. 2 is a detailed circuit diagram of the power supply of FIG. 1.

Referring to FIG. 2, the power supply is illustrated in detail, in which an externally supplied AC voltage input is rectified at the rectifying circuit 10, and is then supplied to the switching power circuit 20.

The switching power circuit 20 includes a main power controller 22, a switching transistor Q1, an initial driving resistor R1, voltage dividing resistors R2 and R3, and a capacitor C4. When an initial driving current is supplied via the initial driving resistor R1, the main power controller 22 activates the switching transistor Q1, thereby inducing a voltage at a secondary winding LS2 of the transformer T1. The induced voltage is rectified by a rectifying diode D3 and the rectified voltage is fed back to the main power controller 22. In this way, the main controller 22 controls the switching transistor Q1. It is known that such a power control device depends on a feedback signal determined by the voltage dividing resistors R2 and R3.

Moreover, when the switching transistor Q1 is turned off, a voltage induced at a secondary winding LS1 of the transformer T1 is rectified by a rectifying diode D1 so as to generate a secondary output voltage Vout1, which is supplied to the display monitor.

Further, the power saving function is controlled by a microcomputer (not shown) provided in the display monitor. The microcomputer generates a power saving control signal, if it is necessary to save power. The power saving control signal is applied to a switching transistor Q2 of the power saving control circuit 30. Upon receiving the power saving control signal, the switching transistor Q2 is turned on. Then, the voltage output from an error amplifier (not shown) provided in the main power controller 22 is bypassed to ground. As a result, the control signal supplied to the switching transistor Q1 goes to a logic low level, thereby turning off the switching transistor Q1. Thus, the output voltage Vout1 is blocked.

At this juncture, a DC voltage output from the rectifying circuit 10 is switched by a power saving mode power controller 42 provided in the power saving mode power circuit 40, so as to induce a voltage at a secondary winding Ls of the transformer T2. The induced voltage is rectified by a rectifying diode D2 to supply an output voltage Vout2 for driving the microcomputer.

Therefore, the voltage Vout1 supplied to most parts of the display monitor is cut off, and the microprocessor, now in the stand-by mode (i.e., the power saving mode), is supplied with the voltage Vout2.

However, such a power supply with this power saving function has a limitation in terms of power saving capability. Therefore, it is a recent trend to employ a power factor correction circuit for improving the efficiency of the power saving. In particular, it is necessary for the display monitor to employ a power supply with the power factor correction circuit in order to save power more efficiently.

Figure 3:
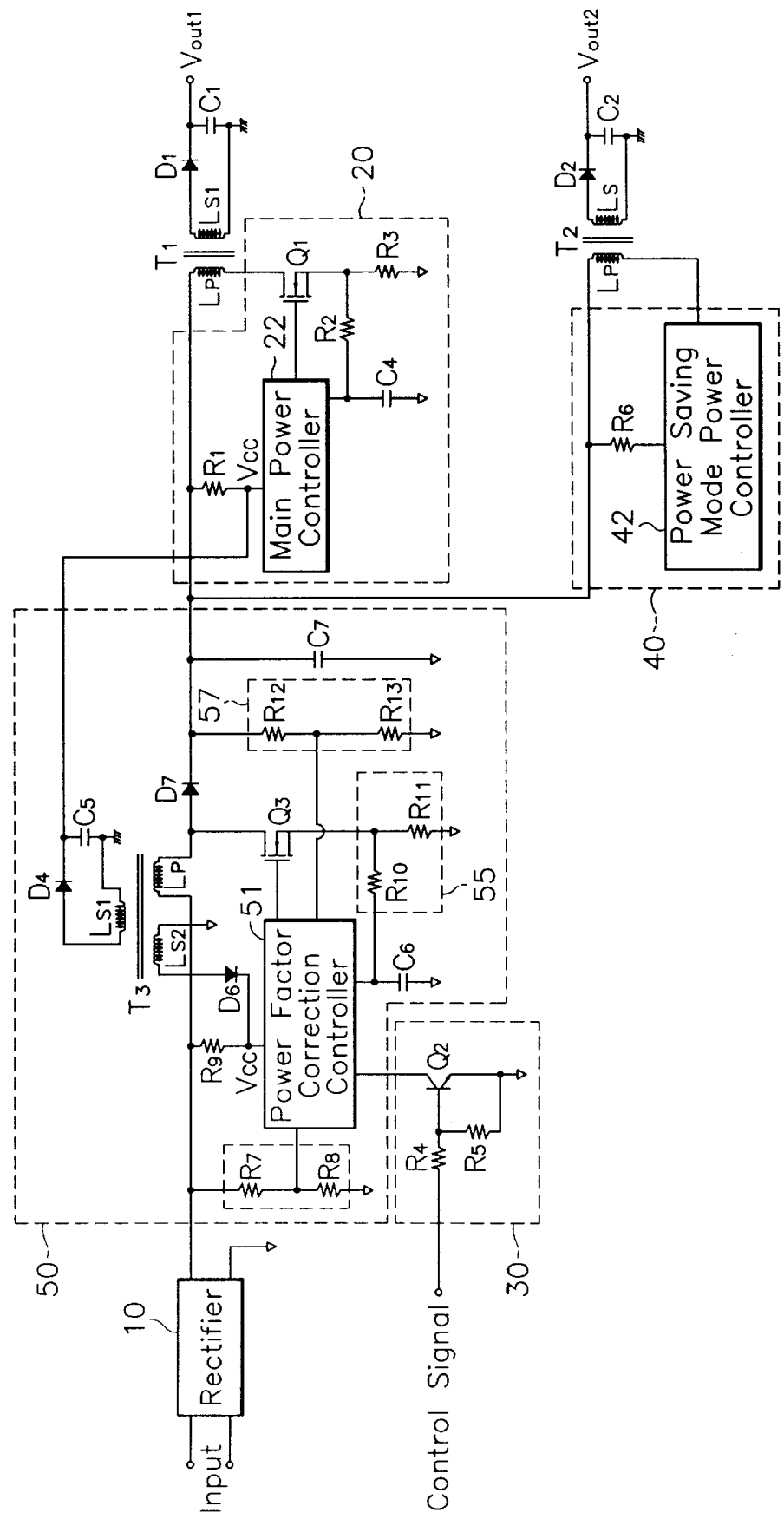
FIG. 3 is a detailed circuit diagram of a power supply with a power factor correction circuit according to an embodiment of the present invention.

Referring to FIG. 3, the power supply for use in a display monitor includes a rectifying circuit 10, a switching power circuit 20, a power saving control circuit 30, a power saving mode power circuit 40, and a power factor correction circuit 50 interposed between the rectifying circuit 10 and the switching power circuit 20. The power supply further includes rectifying diodes D1 and D2, and smoothing capacitors C1 and C2.

The power factor correction circuit 50 includes a power factor correction controller 51, an initial driving resistor R9, voltage dividing circuit 53 (resistors R7 and R8), voltage dividing circuit 55 (resistors R9 and R10), voltage dividing circuit 57 (resistors R12 and R13), a switching transistor Q3, and smoothing capacitors C5 and C7. The power factor correction circuit 50 further includes a transformer T3, rectifying diodes D4, D6 and D7, and a capacitor C6. Power factor correction controller 51 can be implemented by use of any commonly employed power factor correction controller, for example, the MC34262 or MC33262 devices manufactured by Motorola. As is well known in the art, the latter devices are high performance, critical conduction, current-mode power factor controllers employing, among other components, an error amplifier and a multiplier.

In operation, the rectifying circuit 10 rectifies an AC voltage input to generate a DC voltage output to the power factor correction circuit 50. The DC voltage is divided by the voltage dividing circuit 53 (resistors R7 and R8), and is applied to a multiplier (not shown) of the power factor correction controller 51. Further, an initial driving current is supplied to the power factor correction controller 51 through the initial driving resistor R9. The power factor correction controller 51 activates the switching transistor Q3 in response to the divided voltage and the initial driving current. Then, a voltage is induced at a secondary winding LS2 of the transformer T3. The induced voltage is rectified by the rectifying diode D6 and is fed back to the power factor correction controller 51 as a driving voltage Vcc. In this manner, the power factor correction controller 51 performs a normal switching operation.

The power factor correction controller 51 performs the switching operation by utilizing a known boost-up method. Namely, when the switching transistor Q3 is turned on, a current flows into the switching transistor Q3 through a primary winding Lp of the transformer T3. Alternatively, when the switching transistor Q3 is turned off, the energy stored in the primary winding Lp of the transformer T3 is rectified and smoothed by the rectifying diode D7 and the smoothing capacitor C7, and the resultant voltage output from the power factor correction circuit 50 is supplied to the switching power circuit 20.

The output voltage level of the power factor correction circuit 50 is determined by the voltage dividing circuit 57 (resistors R12 and R13). Further, the voltage induced at the secondary winding LS1 of the transformer T3 is rectified by the rectifying diode D4, and is supplied to main power controller 22 as a driving voltage Vcc.

In the meantime, if a power saving control signal generated by a microcomputer is applied to transistor Q2 of the power saving control circuit 30, the output signal of an error amplifier (not shown) of the power factor correction controller 51 is bypassed to ground, thereby turning off the switching transistor Q3. Therefore, the voltage applied to the main power controller 22 by means of the secondary winding LS1 of the transformer T3 is cut off, thereby inactivating the main power controller 22.

As the result, the power supply according to the present invention operates in the stand-by mode (i.e., the power saving mode), in which only power saving mode power supply circuit 40 operates to supply an output voltage Vout2 to the microcomputer as the operational power source thereof.

As described heretofore, a power supply having the power factor correction circuit of the present invention improves the power factor and performs a power saving function, so that the power efficiency of the display monitor is increased and the power consumption of the display monitor is decreased.

The preferred embodiment is given by way of example, and as a means for explaining the use and making of the present invention. The embodiment is subject to a routine modification by those of ordinary skill in the art. The present invention is not limited to the illustrative embodiments, but is defined by the appended claims.

What is claimed is:

1. A power supply for use in a display monitor, comprising:

rectifier means for rectifying an AC voltage input to generate a DC voltage;

switching power circuit means including a main power controller for controlling a voltage applied thereto, and for supplying main power to a microcomputer in said display monitor;

a power saving control circuit which is switched in response to a power saving control signal generated by said microcomputer in said display monitor;

power saving mode power circuit means for supplying power to said microcomputer during a power saving mode; and a power factor correction circuit disposed between said rectifier means and said switching power circuit means for correcting a power factor of said DC voltage, for supplying to said switching power circuit means a corrected power factor voltage comprising a driving voltage to said main power controller, and for cutting off said driving voltage supplied to said main power controller during said power saving mode.

2. The power supply according to claim 1, wherein said power factor correction circuit comprises:

controller means for correcting the power factor of the DC voltage generated by said rectifier means;

initial driving power input means for supplying an initial driving current to said controller means;

transformer means for supplying driving voltages to said controller means and said main power controller;

a switch which is switched by said controller means;

voltage divider means connected to said rectifier means for supplying a predetermined divided voltage of said DC voltage to said controller means;

additional rectifier means for rectifying first and second induced voltages of said transformer; and smoothing circuit means for smoothing said first and second induced voltages of said transformer means.

3. The power supply according to claim 2, wherein said voltage divider means divides said DC voltage to generate a first divided voltage and to provide the first divided voltage to said controller means; and wherein said power supply further comprises first additional voltage divider means for dividing an output voltage from said controller means to generate a second divided voltage which is fed back to said controller means, and second additional voltage divider means for dividing an output voltage generated by a primary winding of said transformer means, and for providing a divided output voltage to said switching power circuit means.

4. The power supply according to claim 2, wherein said additional rectifier means comprises:

a first rectifier for rectifying an output voltage of a primary winding of said transformer means to provide a first rectified output voltage to said switching power circuit means;

a second rectifier for rectifying an output voltage from a first secondary winding of said transformer means to provide a second rectified output voltage to said controller means; and a third rectifier for rectifying an output voltage from a second secondary winding of said transformer means to provide a third rectified output voltage to said main power controller.

5. The power supply according to claim 4, wherein said smoothing circuit means comprises:

a first smoothing circuit for smoothing the first rectified output voltage from said first rectifier prior to provision to said switching power circuit means; and a second smoothing circuit for smoothing the third rectified output voltage from said third rectifier prior to provision to said main power controller.

6. A power supply for use in a display monitor having a microcomputer, said power supply comprising:

rectifier means for rectifying an AC voltage input to generate a DC voltage;

switching power circuit means responsive to a voltage input for providing a main power supply to said microcomputer in a non-power saving mode;

power saving control circuit means responsive to a control signal from said microcomputer for switching said power supply from said non-power saving mode to a power saving mode;

power saving mode power circuit means responsive to switching of said power supply to said power saving mode for supplying power to said microcomputer during said power saving mode; and power factor correction circuit means connected to said rectifier means for correcting a power factor of said DC voltage so as to supply to said switching power circuit means a corrected power factor voltage, said switching power circuit means being responsive to said corrected power factor voltage for providing said main power supply to said microcomputer;

said power factor correction circuit means being connected to said power saving control circuit means and being responsive to switching of said power supply to said power saving mode for cutting off said corrected power factor voltage supplied to said switching power circuit means, said power saving mode power circuit means being responsive to cut off of said corrected power factor voltage for supplying power to said microcomputer during said power saving mode.

7. The power supply according to claim 6, wherein said power factor correction circuit means comprises a first voltage divider for voltage dividing said DC voltage from said rectifier means.

8. The power supply according to claim 6, wherein said power factor correction circuit means comprises a transformer having a primary winding connected to said rectifier means for supplying a driving voltage to said switching power circuit means.

9. The power supply according to claim 8, wherein said transformer comprises a secondary winding responsive to a primary voltage generated in said primary winding for developing an induced secondary voltage, said induced secondary voltage being provided to said switching power circuit means.

10. The power supply according to claim 9, wherein said transformer further comprises an additional secondary winding responsive to a primary voltage generated in said primary winding for developing an additional induced voltage, said additional induced voltage comprising a supply voltage for said power factor correction circuit means.

11. The power supply according to claim 10, said power factor correction circuit means further comprising a rectifier connected to said additional secondary winding for rectifying said additional induced voltage prior to use as a supply voltage for said power factor correction circuit means.

12. The power supply according to claim 8, said power factor correction circuit means further comprising a rectifier connected between said primary winding of said transformer and said switching power circuit means for rectifying the primary winding voltage prior to provision to said switching power circuit means.

13. The power supply according to claim 8, said power factor correction circuit means further comprising a voltage divider connected to said primary winding of said transformer for voltage dividing the voltage generated in said primary winding prior to provision to said switching power circuit means.

14. The power supply according to claim 6, wherein said power factor correction circuit means further comprises a field effect transistor switch for cutting off said driving voltage supplied to said switching power circuit means during said power saving mode.

\* \* \* \* \*